United States Patent [19]

Villemin et al.

[11] Patent Number: 4,998,322
[45] Date of Patent: Mar. 12, 1991

[54] SYSTEM FOR DEWINGING FOWL

[75] Inventors: Daniel Villemin, Chennevieres sur Marne; Janusz Plusa, Champigny sur Marne; Daniel Guilbaud, Saint Fulgent; Jean Leclere, Creteil, all of France

[73] Assignees: Etablissements Arrive S.A., Saint Fulgent; Union Financiere Pour le Developpement de L'Economie Cerealiere - Unigrains, Paris, both of France

[21] Appl. No.: 464,515

[22] Filed: Jan. 12, 1990

[30] Foreign Application Priority Data

Jan. 13, 1989 [FR] France ................................. 89 00569

[51] Int. Cl.$^5$ .............................................. A22C 21/00
[52] U.S. Cl. .......................................... 452/71; 452/71
[58] Field of Search ........................................ 17/11, 45

[56] References Cited

U.S. PATENT DOCUMENTS 4,648,155 3/1987 Burnett ..................................... 17/11
4,669,148 6/1987 Scheier ..................................... 17/11

Primary Examiner—Willis Little
Attorney, Agent, or Firm—Herbert Dubno; Andrew M. Wilford

[57] ABSTRACT

An apparatus for dewinging a bird comprises a generally stationary base, a holder that supports the bird to be dewinged stationarily adjacent the base, and a carriage longitudinally displaceable forward on the base. The carriage can be displaced relative to the base longitudinally forward toward the bird and backward away from the bird. A pair of transversely spaced and transversely displaceable grippers carried on the carriage are engageable around wings of the bird on the holder when the carriage is displaced forward adjacent the bird. These grippers can be closed on the wings and transversely displaced apart after closing of same for tearing the wings from the bird on the holder.

8 Claims, 1 Drawing Sheet

SYSTEM FOR DEWINGING FOWL

FIELD OF THE INVENTION

The present invention relates to an apparatus for disassembling a bird in a meat-packing operation. More particularly this invention concerns a method of and apparatus for removing the wings and associated structure from fowl.

BACKGROUND OF THE INVENTION

In the preparation of a large bird for sale it is standard to cut the bird up after slaughter into several pieces. A turkey is cleaned by removing the viscera and then rinsing the animal. Then the bird is hung from a conveyor chain which moves it through a plurality of stations at which pieces are cut off it, it is deboned, and so on. Clearly this process requires a substantial amount of manual work and has the considerable disadvantage that the quality of the end product depends directly on the abilities of the people doing the various steps. Furthermore a normally significant amount of meat is left hanging on the body or lodged in cavities thereof.

The general morphology of a fowl is comprised generally as follows:

The front end of the thorax is closed by a bony architecture defined by the vertebral column, the base of the neck of the animal, the clavicles, and the coracoids.

The central part of the body is defined by the vertebral column, the ribs, and the sternum.

The rear part of the more or less concave pelvis ending in the pygostyle and the ischium includes joint regions for the femurs as well as the iliac fossae.

Because of the complexity of this structure it is very difficult to completely separate the meat from the skeleton. The coracoids are among the most difficult elements because they form parts that project from the skeleton and define therewith hollows from which it is difficult to extract the meat. It has thus been proposed to cut or to dislocate the coracoids and then to proceed during the subsequent cutting-up of the fowl to tearing them out in order to be able to recover meat lodged in the hollows, that is the breast meat, the back meat, and even the coracoid meat. The aim is to use a tool that can move as close as possible to the body so as to facilitate removal of the meat therefrom.

There are several main ways to achieve this goal:

In one system the tendons at the junction between each coracoid and the sternum are cut, the coracoids are dislocated and then the wings are ripped off With the shoulder blades.

In a second system the coracoids are cut before tearing off the wings so that the parts of the coracoids adjacent the sternum remain on the body.

In a third system a cut is formed at the level of the joint of each wing before the wings alone are torn off.

None of these arrangement has been reduced to an easily performed if not automated procedure. Accordingly removal of the wing structure from a bird is often a bottleneck in a meat-packing operation.

OBJECTS OF THE INVENTION

It is therefore an object of the present invention to provide an improved system for dewinging a bird.

Another object is the provision of such an improved system for dewinging a bird which overcomes the above-given disadvantages, that is which can operate almost entirely automatically to neatly and fully remove the wing, including the coracoid and shoulder blade if desired.

SUMMARY OF THE INVENTION

An apparatus for dewinging a bird according to this invention comprises a generally stationary base, a holder that supports the bird to be dewinged stationarily adjacent the base, and a carriage that can be displaced relative to the base longitudinally forward toward the bird and backward away from the bird. A pair of transversely spaced and transversely displaceable grippers carried on the carriage are engageable around wings of the bird on the holder when the carriage is displaced forward adjacent the bird. These grippers can be closed on the wings and transversely displaced apart after closing of same for tearing the wings from the bird on the holder.

With the system according to this invention a controller is provided for first pushing the carriage longitudinally forward toward the bird with the grippers open and relatively close together to fit the grippers around the wings of the bird, then closing the grippers on the wings of the bird near the insertions thereof, and finally generally simultaneously transversely displacing the grippers apart and pulling the carriage longitudinally backward so as to tear the wings from the bird.

In a system where the coracoids have been sawed, broken, split, or dislocated in advance or where the front part of the breast-meat fillets has been cut off, this operation makes it possible to remove the coracoids as well as the wings and the front part of the fillets, leaving the skeleton exposed for easy removal of the fillets. In the simplest method a dorsal cut is performed as described in copending U.S. Pat. application No. 464,513.

In accordance with a further feature of the invention the carriage is provided with respective longitudinally extending rotatable shafts having outer ends provided with eccentric extensions carrying the grippers. These shafts are oppositely rotated for relatively transversely displacing the grippers. The two grippers are mounted symmetrically with respect to a plane that also symmetrically bisects the bird being dewinged. Due to the eccentric mounting of the grippers on the shafts, their counter-rotation inherently rotates them together or apart. The drive for these shafts is a fluid-operated cylinder mounted on the carriage and connected to the shafts. Furthermore the grippers are opened and closed by respective fluid-operated cylinders carried on the shafts.

The holder according to this invention supports the bird with its back generally parallel to a back axis forming an obtuse angle with the longitudinal direction of displacement of the carriage. This angular positioning takes into account how the muscles of the bird run to facilitate tearing off the wings.

In accordance with a further inventive feature a clamp is fixed on the base for engaging and pressing down the bird on the holder when the grippers engage the wings. This clamp solidly stabilizes the gutted bird body during the dewinging.

DESCRIPTION OF THE DRAWING

The above and other objects, features, and advantages will become more readily apparent from the following, reference being made to the accompanying drawing in which.

DETAILED DESCRIPTION

Figure 1:
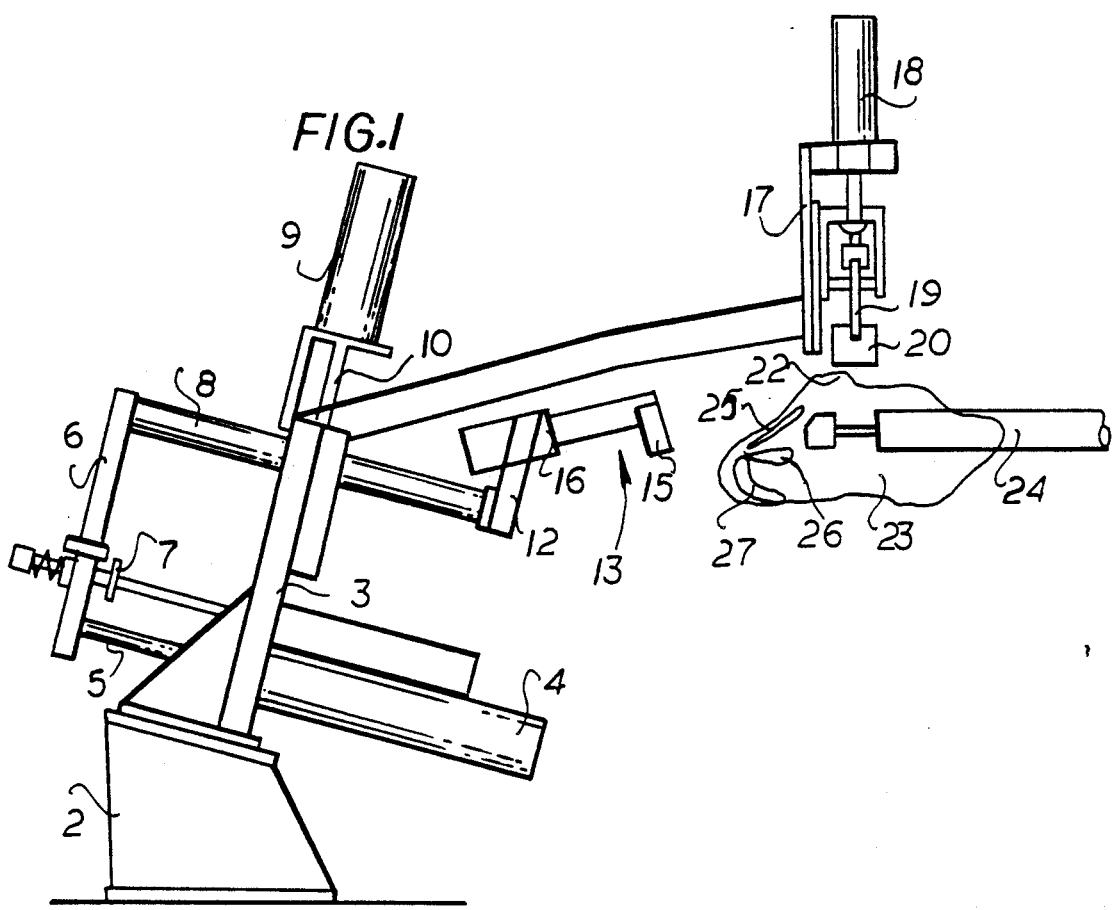
FIG. 1 is a partly diagrammatic small-scale side view of the apparatus according to this invention.

As seen in FIG. 1 the apparatus according to this invention basically comprises a stationary base 2 from which a post 3 extends at an angle to the vertical. A hydraulic ram 4 is fixed on this post 3 and has a piston rod 5 connected to a carriage 6 that can be moved in a longitudinal direction at a very sharp acute angle to the horizontal. A stop 7 is provided for limiting the stroke of the piston rod 5 carrying the carriage 6.

Guided on the post 3 and extending parallel to the piston rod 5 are two parallel shafts 8 each having an outer end fixed to the carriage 6 and an inner end provided with a radially projecting arm 12 carrying a gripper 13. These shafts B are rotatable about their parallel axes on the carriage 6 and to this end are provided with gears 11 (see FIG. 2) meshing with a double-edged rack 12 carried on a piston rod 10 of another ram 9 carried on the post 3. Thus as the ram 9 moves the piston rod 10 it can counterrotate the shafts 8. The grippers 3 each comprise a short fixed jaw 14 and a long movable jaw 15, the latter being displaceable toward and away from the fixed jaw 14 by a respective cylinder 16 carried on the outer end of the arm 12 with the gripper 13. In addition another support 17 fixed on the post 13 carries yet another vertically extensible hydraulic ram 18 having a piston rod 19 whose lower end is fitted with a downwardly V-shaped foot 20.

According to this invention a body holder 24 of the type described in U.S. Pat. No. 4,656,692 holds a gutted bird body 23 with its back downward, its sternum 22 upward, and its coracoids 25, wings 26, and shoulder blades 27 directed toward the grippers 13. The axes of the shafts 8 are inclined downward from their ends remote from the bird 23 and the grippers 13 themselves extend somewhat upward so that the jaws 14 and 15 can close perpendicularly on the coracoids 25.

Figure 2:
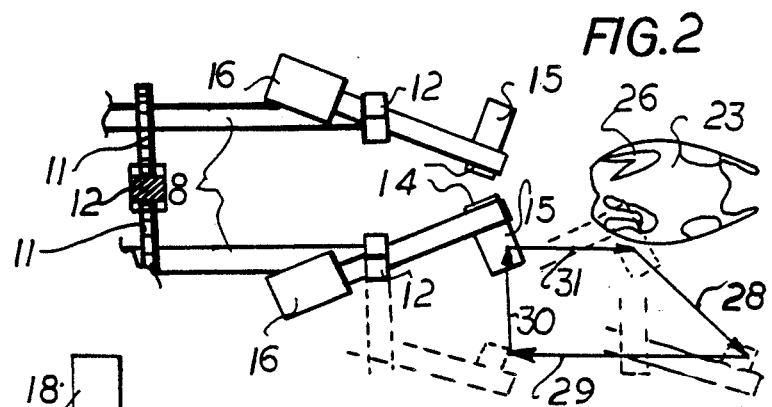
FIG. 2 is a top view of the apparatus shown in FIG. 1.
Figure 3:
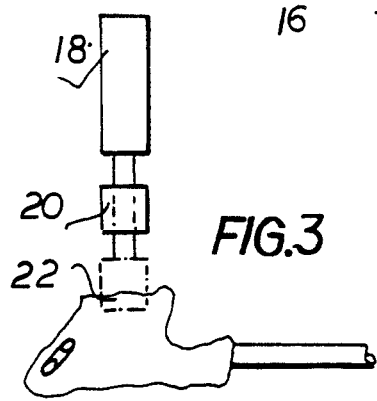
FIG. 3 is a view of a detail of FIG. 1.

According to this invention when an unillustrated sensor detects a bird body 23 in the position illustrated in FIGS. 1 and 2 the ram 18 is first actuated to press down the shoe 20 and clamp the body tightly in place on the holder 24. Then the ram 4 is contracted to push the grippers 3, which are in the solid-line closely spaced position of FIG. 2, toward the body 3 until these grippers 13 are engaged over the coracoids 25.

Figure 4:
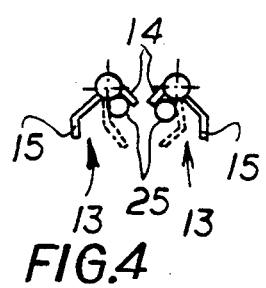
FIG. 4 is an end view of a portion of the apparatus.

Thereafter the cylinders 16 are activated to move the jaws 15 toward the jaws 14 and tightly engage and grab the coracoids 25 shown as circles in FIG. 4. Subsequently the cylinders 16 are actuated simultaneously with the cylinder 4 so as to pivot the shafts 8 counterclockwise and move the grippers 13 apart into the dashed line position of FIG. 2 while the ram 4 contracts further and pulls the wings 26 backward off the body 23. Thus the grippers 13 move obliquely as shown by arrow 28 in FIG. 2.

Subsequently the ram 4 is extended to move the grippers 3 straight back in the spread position as illustrated at arrow 29 in FIG. 2 and the grippers 13 are opened to drop the torn-off wings.

Finally the ram 11 is operated to pivot the now open grippers 13 inward as indicated by arrow 30 so that a new cycle can be started with displacement in the direction of arrow 31 as described above.

Thus with the system of this invention it is possible to accurately remove the entire wings and shoulder blades from the turkey body 23 almost entirely automatically. This procedure is substantially assisted if the back of the body 23 has been incised at the base of the coracoids in the manner described in the copending U.S. Pat. application No. 464,513.

We claim:

1. An apparatus for dewinging a bird, the apparatus comprising:
   a generally stationary base;
   means for holding the bird to be dewinged stationarily adjacent the base;
   a carriage longitudinally displaceable forward on the base;
   means for displacing the carriage relative to the base longitudinally forward toward the bird and backward away from the bird;
   a pair of transversely spaced and transversely displaceable grippers carried on the carriage engageable around wings of the bird on the holding means when the carriage is displaced forward adjacent the bird;
   means for closing the grippers on the wings; and
   means for transversely displacing the grippers apart after closing of same for tearing the wings from the bird on the holding means.

2. The dewinging apparatus defined in claim 1, further comprising control means connected to the closing and displacing means for sequentially:
   pushing the carriage longitudinally forward toward the bird with the grippers open and relatively close together to fit the grippers around the wings of the bird;
   closing the grippers on the wings of the bird; and
   generally simultaneously transversely displacing the grippers apart and pulling the carriage longitudinally backward so as to tear the wings from the bird.

3. The dewinging apparatus defined in claim 1 wherein the carriage is provided with respective longitudinally extending rotatable shafts having outer ends provided with eccentric extensions carrying the grippers, the transverse displacement means oppositely rotating the shaft for relatively transversely displacing the grippers.

4. The dewinging apparatus defined in claim 3 wherein the transverse displacement means includes a fluid-operated cylinder mounted on the carriage and connected to the shafts.

5. The dewinging apparatus defined in claim 3 wherein the closing means includes respective fluid-operated cylinders carried on the shafts.

6. The dewinging apparatus defined in claim 1 wherein the holding means supports the bird with its back generally parallel to a back axis forming an obtuse angle with the longitudinal direction of displacement of the carriage.

7. The dewinging apparatus defined in claim 1, further comprising
   clamp means fixed on the base for engaging and pressing down the bird on the holding means when the grippers engage the wings.

8. A method of operating an apparatus for dewinging a bird comprising:
   a generally stationary base;

a carriage longitudinally displaceable forward on the base;

a pair of transversely spaced and transversely displaceable grippers carried on the carriage engageable around wings of the bird on the holding means when the carriage is displaced forward adjacent the bird; the method comprising the steps of:

holding the bird to be dewinged stationarily adjacent the base;

pushing the carriage longitudinally forward toward the bird with the grippers open and relatively close together to fit the grippers around the wings of the bird;

closing the grippers on the wings of the bird; and generally simultaneously transversely displacing the grippers apart and pulling the carriage longitudinally backward so as to tear the wings from the bird.

* * * * *